(12) United States Patent
Milliken et al.

(10) Patent No.: US 7,095,753 B1
(45) Date of Patent: Aug. 22, 2006

(54) DIGITAL NETWORK PROCESSOR-BASED MULTI-PROTOCOL FLOW CONTROL

(75) Inventors: Walter Clark Milliken, Dover, NH (US); Alden W. Jackson, Jamaica Plain, MA (US)

(73) Assignee: BBN Technologies Corp., Cambridge, MA (US)

( * ) Notice: Subject to any disclaimer, the term of this patent is extended or adjusted under 35 U.S.C. 154(b) by 941 days.

(21) Appl. No.: 09/949,417

(22) Filed: Sep. 7, 2001

Related U.S. Application Data

(60) Provisional application No. 60/233,945, filed on Sep. 19, 2000.

(51) Int. Cl.
*H04J 3/16* (2006.01)
*H04L 12/28* (2006.01)
*G01G 31/08* (2006.01)

(52) U.S. Cl. .................. 370/465; 370/466; 370/395.5; 370/236; 370/388

(58) Field of Classification Search .............. 370/235, 370/235.1, 236, 236.1, 395.42, 396, 410, 370/412, 413, 414, 417, 395.5, 465, 466, 370/467, 386, 388, 390, 398

See application file for complete search history.

(56) References Cited

U.S. PATENT DOCUMENTS

| | | | | |
|---|---|---|---|---|
| 5,959,995 A | * | 9/1999 | Wicki et al. | 370/400 |
| 6,233,242 B1 | * | 5/2001 | Mayer et al. | 370/412 |
| 6,243,361 B1 | * | 6/2001 | McMillen et al. | 370/254 |
| 6,256,306 B1 | * | 7/2001 | Bellenger | 370/389 |
| 6,442,139 B1 | * | 8/2002 | Hosein | 370/236 |
| 6,584,101 B1 | * | 6/2003 | Hagglund et al. | 370/389 |
| 6,674,718 B1 | * | 1/2004 | Heddes et al. | 370/230 |
| 6,850,989 B1 | * | 2/2005 | Lavian et al. | 709/242 |

* cited by examiner

*Primary Examiner*—Hanh Nguyen
(74) *Attorney, Agent, or Firm*—Fish & Neave IP Group Ropes & Gray LLP

(57) ABSTRACT

Multiple network processors (201, 202, 203) are connected in a pipeline via control (206) and data (205) ports of the network processors. The network processors (201, 202, 203) communicate with neighboring network processors through the control and data ports. Through these ports, the network processors can implement a variety of data flow control protocols.

31 Claims, 7 Drawing Sheets

DIGITAL NETWORK PROCESSOR-BASED MULTI-PROTOCOL FLOW CONTROL

RELATED APPLICATION

This application claims priority under 35 U.S.C. § 119 based on U.S. Provisional Application No. 60/233,945, filed Sep. 19, 2000, the disclosure of which is incorporated herein by reference.

BACKGROUND OF THE INVENTION

A. Field of the Invention

The present invention relates to network devices and, more specifically, to network devices for implementing network protocols that control data flow.

B. Description of Related Art

In digital communication systems, data is routinely transmitted over processing devices in a network. In packet-based networks, for example, data is transmitted in discrete quantities known as packets. A packet destined for a remote computer is typically transmitted through multiple intermediate network devices (e.g., through routers, switches, or bridges) before reaching its final destination. At each intermediate device, the intermediate network device may examine the packet and, based on the examination, determine the next network device (or hop) to which to transmit the packet.

Each intermediate network device runs one or more protocols that define how the device is to forward received packets. For example, the intermediate network device may assign the packet a high transmission priority, may apply quality of service rules to the packet, or perform error checking operations on the packet to ensure that the packet has not suffered transmission errors.

The protocols are often performed in the network devices by general purpose processors. In high performance network devices, such as high performance routers or switches, it can be difficult for these general purpose processors to keep up with the input data flow. Accordingly, specialized network processors, which may implement frequently used network operations in hardware, have been developed. These specialized processors may be optimized for protocol processing.

One function which may be performed by specialized processors is data flow control. Flow control refers to the management of data flow between devices so that the data can be handled at an efficient pace. Too much data arriving before a device can handle it can cause data overflow, potentially resulting in lost data. Flow control can also be applied in the context of refusing additional device connections until the flow of data has subsided.

It is desirable to enable specialized network processors to implement a wide variety of flow control techniques in the context of various network protocols.

SUMMARY OF THE INVENTION

Systems and methods consistent with the present invention address these and other needs by providing for a network processor in which multiple network protocols can be flexibly implemented in a pipelined fashion to perform a variety of flow control techniques.

In one aspect, the present invention is directed to a network device including a first network processor and a second network processor. The first and second network processors include data ports and control ports. The data and control ports connect the first and second network processors together in a pipeline configuration through which the first and second network processors implement data transmission protocols.

A second aspect of the present invention is directed to a method for performing network data flow protocols. The method includes configuring each of a number of network processors to implement a portion of the network data flow protocols and coupling the network processors together as a pipeline. Further, the method includes transmitting network data between the network processors in a first direction relative to the pipeline through data ports of each of the plurality of network processors, and transmitting control information between the network processors in a second direction relative to the pipeline through control ports of each of the network processors.

Yet another aspect consistent with principles of the present invention is directed to a network processor including a control port and a network data port configured to communicate network data to a network data port of a neighboring network processor. The control port is configured to communicate control information to a network control port of the neighboring network processor. The network processor and the neighboring network processor are coupled together through the data and control ports as a pipeline in which stages of the pipeline implement portions of a network data flow control protocol.

BRIEF DESCRIPTION OF THE DRAWINGS

The accompanying drawings, which are incorporated in and constitute a part of this specification, illustrate the invention and, together with the description, explain the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

As is generally described herein, a series of network processors are implemented in a pipeline. The network processors may connect to their neighboring network processors through a data port and a control port. Through these ports, the network processors may implement data transmission protocols.

System Description and Network Processor Configurations

Figure 1:
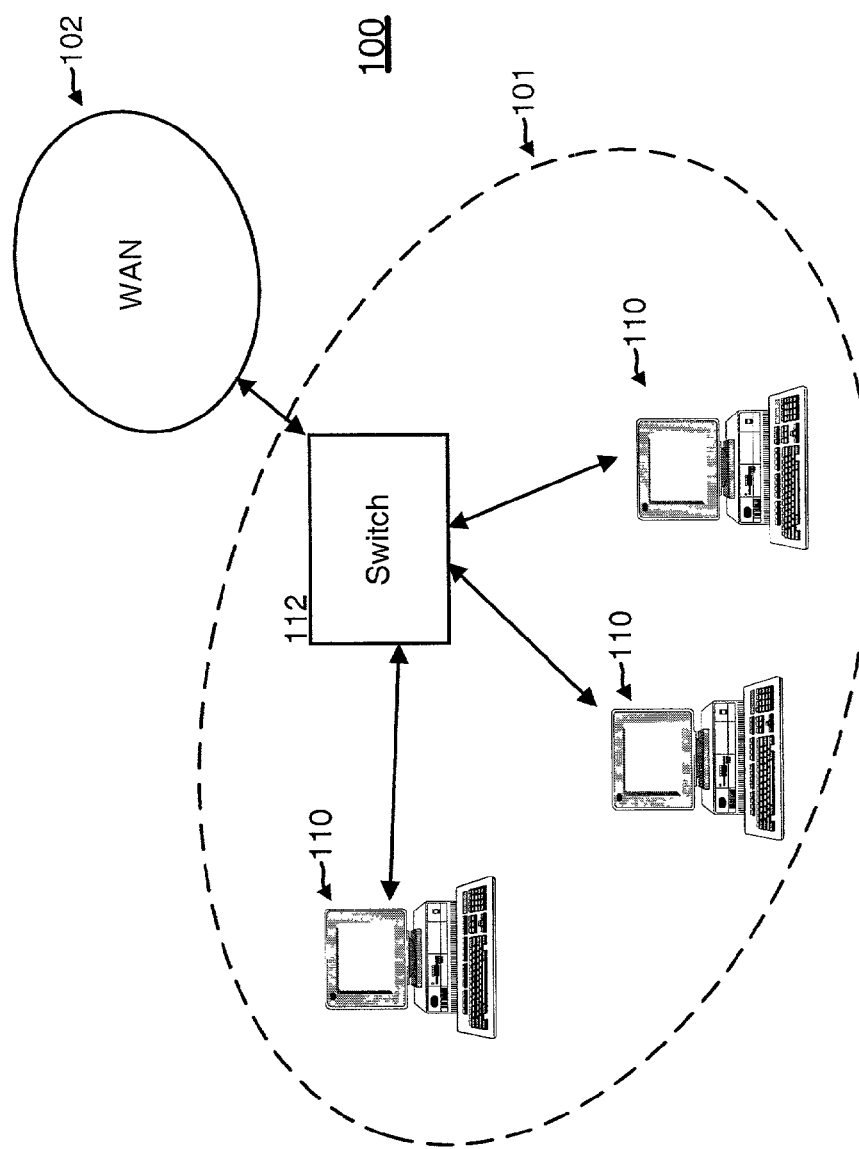
FIG. 1 is a high level diagram of an exemplary computer network in which systems and methods consistent with the present invention may be implemented.

FIG. 1 is a high level diagram of an exemplary computer network 100 in which concepts consistent with the present invention may be implemented. The computer network 100 includes a local subnet network 101 connected to a wide area network (WAN) 102. Local subnet 101 may be, for example, a local corporate network and WAN 102 may be the Internet. Alternately, local subnet network 101 may be any other subnetwork within a larger WAN 102. As shown, local subnet 101 includes a number of computing devices, such as personal computers 110. It should be understood that local subnet 101 may contain other computing devices, such as laptops and personal digital assistants. A switch (or alternately, a router) 112 forwards information between personal computers 110. Personal computers 110 may additionally communicate with devices through WAN 102. In this situation, switch 112 may forward an information packet from one of personal computers 110 to network 102. For example, switch 112 may transmit a packet of information from one of personal computers 110 to an intermediate router (not shown) in network 102, which may then further forward the packet in the direction of the destination device.

Figure 2:
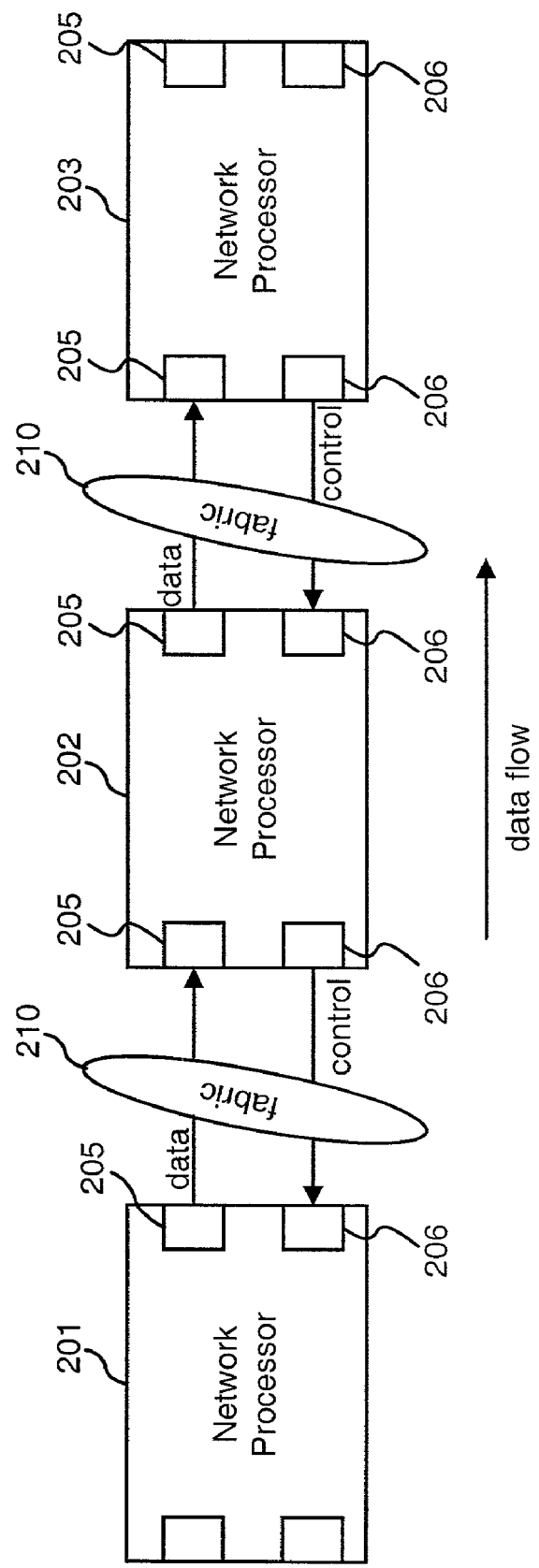
FIG. 2 is a diagram illustrating a number of network processors connected in a pipeline fashion in a "reverse two-port" configuration consistent with principles of the invention.

It is desirable for switch 112 to be able to handle high volumes of network traffic. Switch 112 may therefore include specialized network processors designed to perform network forwarding functions as quickly as possible. FIG. 2 is a diagram illustrating a number of network processors 201–203 connected in a pipeline fashion in a manner consistent with principles of the present invention. The network processors 201–203 are connected to neighboring network processors through fabric 210. In one implementation, fabric 210 may be a simple direct wire connection. In other implementations, fabric 210 may be a more complicated arrangement of switching elements, such as, for example, a crossbar switch or a multi-stage network composed of crossbar switching elements. Through fabric 210, each network processor is coupled to its neighboring network processor via its data ports 205 and control ports 206. In the implementation illustrated in FIG. 2, data and control information flow in opposite directions. This configuration is referred to herein as a "reverse two-port" configuration.

Figure 3:
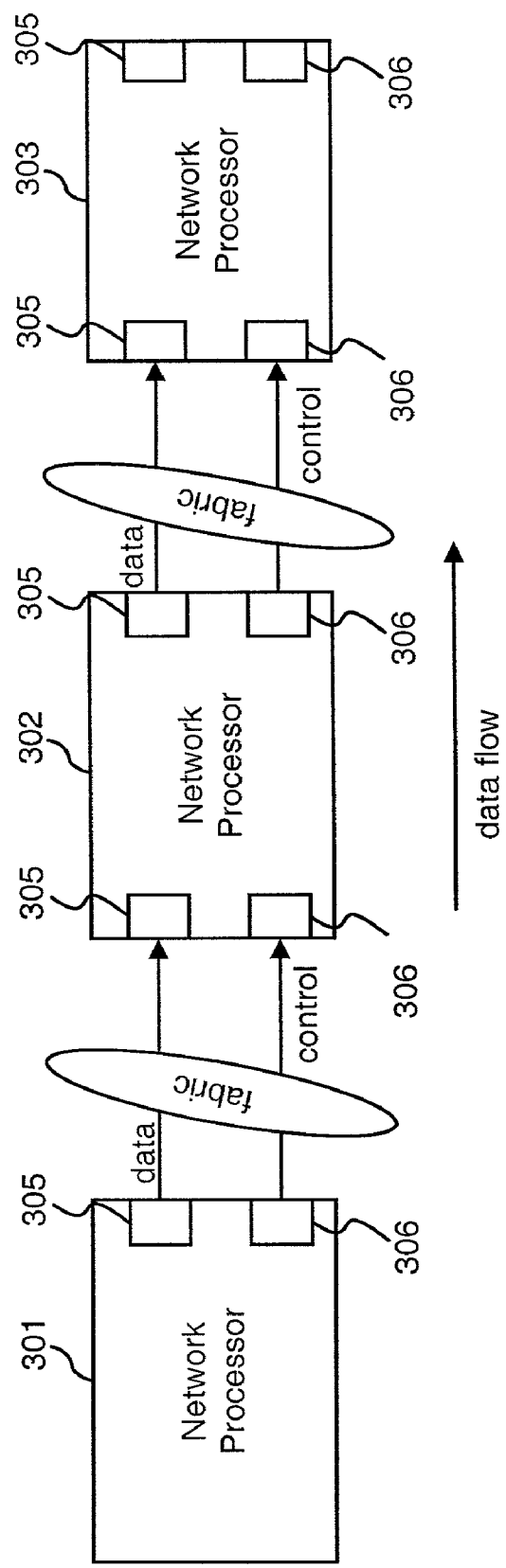
FIG. 3 is a diagram illustrating a "forward two-port" configuration of network processors consistent with principles of the invention.

In addition to the reverse two-port configuration, data and control information may flow in the same direction. FIG. 3 is a diagram illustrating a "forward two-port" configuration including three pipelined network processors 301–303. The forward two-port configuration is similar to the reverse two-port configuration in that network processors 301–303 are arranged as a pipeline. Additionally, network processors 301–303 each connect to their neighbor through a fabric that couples corresponding data ports 305 and control ports 306 of the neighboring network processors. Unlike the reverse two-port configuration, however, in the forward two-port configuration the control information flows in the same direction as the data.

In operation, network processors 201–203 and 301–303 may be used in a number of network devices to implement network protocols. One example of such a network device is switch 112.

Network Processor Applications

As previously mentioned, multiple network processors may be connected in a pipeline configuration to implement system-level flow control.

Figure 4:
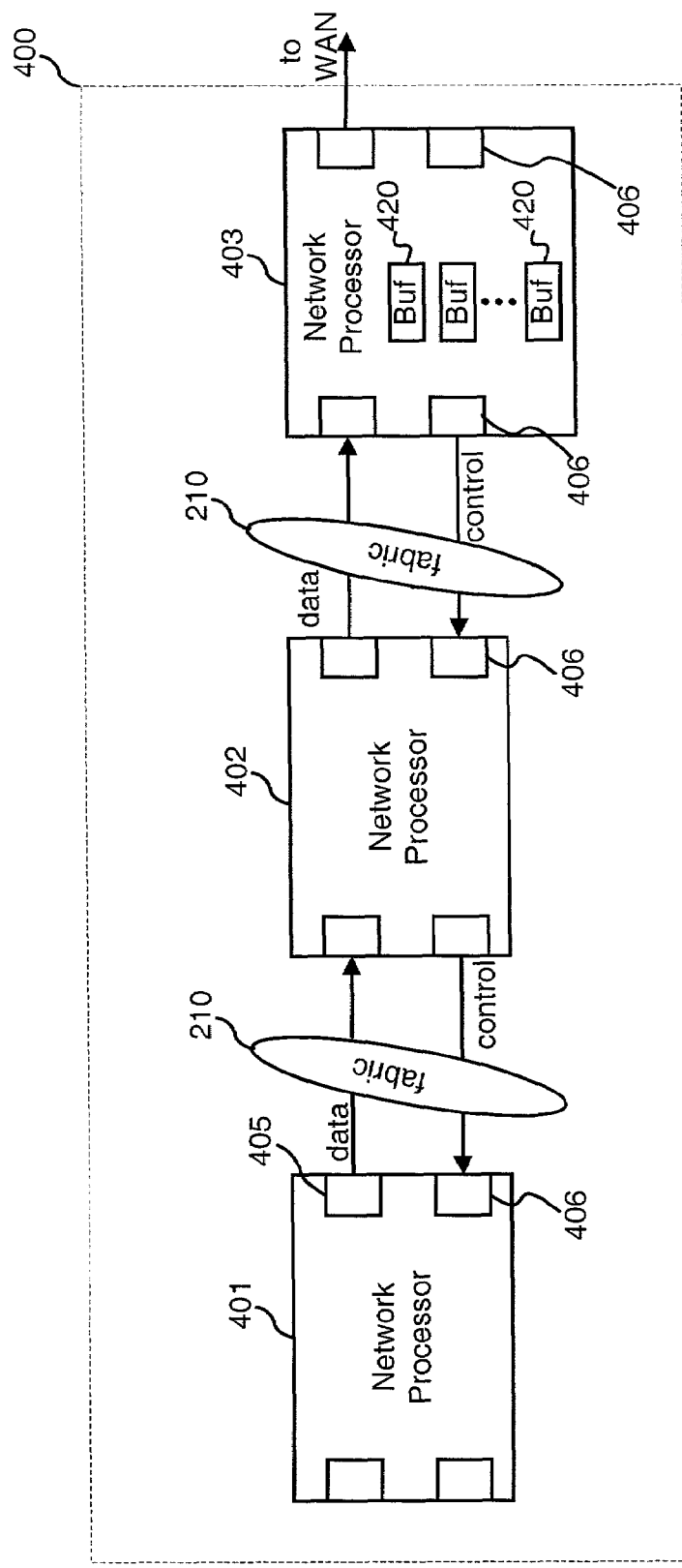
FIG. 4 is a diagram illustrating an application of the reverse two-port configuration shown in FIG. 2.

FIG. 4 is a diagram illustrating application of the reverse two-port configuration in implementing egress feedback flow control in a network device 400. Network device 400 may be, for example, a network switch or router. In this application, network processors 401–403 may be network processors that, in addition to forwarding data, each implement a portion of the functionality of network device 400. For example, network processors 401–403 may perform various functions related to processing of packets received at network device 400. More specifically, network processor 401 may receive and buffer packet headers. Network processor 402 may then receive and analyze the packet header information, and forward the packet data along with control information relating to the packets to egress network processor 403, which outputs the packets to, for example, a WAN.

Network processors 401–403 are coupled together through their data ports 405 and control ports 406. Additionally, egress network processor 403 includes one or more buffers 420 (or alternatively, the network processor 403 may control external buffers). In one implementation, buffers 420 may be first-in-first-out (FIFO) buffers. Data received from network processor 402 is stored in buffers 420 before it is transmitted to the WAN.

Consistent with the principles of the present invention, network processor 403 uses its control port 406 to transmit control information to network processor 402. Network processor 402 may further forward its received control information to network processor 401. The control information carries data requests from network processor 403. For example, if one of buffers 420 is low (e.g., it contains below a predetermined amount of data), network processor 403 may request additional data for that buffer from network processor 402. If network processor 402 has data available to send, it responds by transmitting the data to network processor 403 through its data port 405. Network processor 402 may similarly request data from network processor 401. In this manner, the flow of data through the pipeline formed by network processors 401–403 is controlled by the downstream network processors. Accordingly, a downstream network processor, such as processor 403, can actively manage its flow of incoming data.

Variations on the egress feedback shown in FIG. 4 are possible. For example, instead of having network processor 403 output the packets directly to the WAN, network processor 403 may output the packets to a number of egress line cards, which may then forward the packets to one or more networks. An external agent (e.g., a switch scheduler), may determine which egress port on network processor 403, and thus which egress line card, to send the packets. In this implementation, the upstream control information from network processor 403 may be more random than the implementation shown in FIG. 4 as it can be dictated by factors outside of the control of network processor 403, such as traffic to the same line card from other inputs. However, the pattern of upstream control information and downstream packet data is the same.

In another variation of the egress feedback system shown in FIG. 4, an upstream network processor, such as network processor 402, may implement a more complex traffic scheduling algorithm when responding to data requests. For example, network processor 402 may respond to a data request by running an algorithm to determine which packet should be passed downstream in response to the data request. That is, network processor 402 may choose some order other than the order in which the packets arrived at network processor 402. The algorithm may incorporate, for example, different priority levels for different packets.

Giving higher priority to different received packets is known in the art. In one such implementation, each arriving packet is associated with a priority. All packets of a given priority are transmitted in their arrival order, but packets of other, higher priorities, may be interleaved arbitrarily. The dequeuing operation (in response to a request for data from downstream) is to look at each priority queue in order, from highest to lowest, and take the first packet found. Thus, if there are four priorities, from 0 (high) to 3 (low), a packet can only be taken from the priority 3 queue if the queues for priorities 0–2 are all empty.

Figure 5:
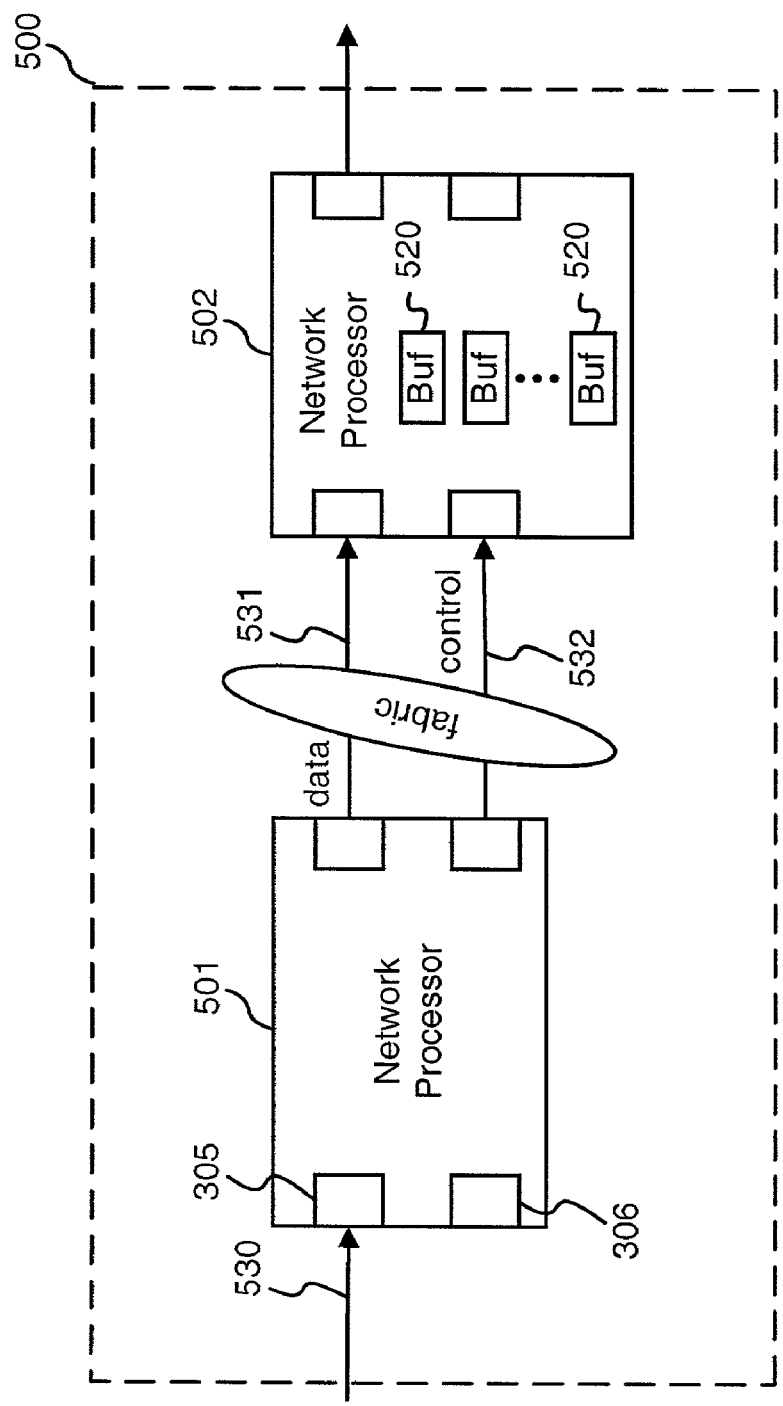
FIG. 5 is a diagram illustrating an application of the forward two-port configuration shown in FIG. 3.

FIG. 5 is a diagram illustrating an application of the forward two-port configuration in implementing data flow control via traffic shaping in a network device 500. One known traffic shaping technique is based on a token bucket metaphor. The token bucket manages a device that regulates data flow. More specifically, each token bucket may be associated with an output queue and an output port. Tokens are added to the bucket at a rate that may vary between different token buckets.

Each bucket has a specified token capacity. Each token gives permission to transmit a certain number of bytes from the buffer associated with the bucket. To transmit data, the device removes from the bucket a number of tokens equal to the size of the data. When not enough tokens are in the bucket to send an incoming unit of data (e.g., a packet), the device either waits until the bucket has enough tokens or it discards the unit of data. If the bucket is already full of tokens, incoming tokens overflow and are not available in the future. Thus, at any time, the largest burst that can be sent is roughly proportional to the size of the bucket. Different token buckets may be given different fill rates and different capacities.

In this manner, the token bucket helps to implement traffic shaping. That is, the token bucket permits "burstiness" but bounds each burst based on the capacity of the bucket. The token bucket also guarantees that the long-term transmission rate will not exceed the established rate at which tokens are placed in the bucket.

Referring back to FIG. 5, network device 500 includes first and second network processors 501 and 502. Network processor 501 implements the token buckets that are used to control buffers 520 in network device 500. In operation, network processor 501 analyzes incoming data stream 530 to determine the destination buffer 520 associated with each unit of incoming data. Based on the status of the token bucket associated with the determined destination buffer, network processor 501 forwards the data units to network processor 502 via data stream 531.

Network processor 501 may append a "pass" or "enqueue" indication with each data unit being transferred over data stream 531. In this manner, network processor 501 "piggy-backs" some control information over the data channel. Network processor 501 may, for example, append a "pass" command with data units associated with a token bucket that has tokens available. Network processor 502, upon receiving the pass command appended with the data unit, may forward the data unit as soon as it is able. On the other hand, if a token bucket does not have enough tokens, network processor 501 may append an "enqueue" indication with the data units it transmits on data stream 531. In this situation, network processor 502 may store the data unit in an appropriate one of buffers 520. Subsequently, when network processor 501 accumulates enough tokens, it may send a "dequeue" command to network processor 502 over command stream 532. The dequeue command informs the network processor 502 that it may now dequeue the previously stored data units from the indicated one of buffers 520.

Figure 6:
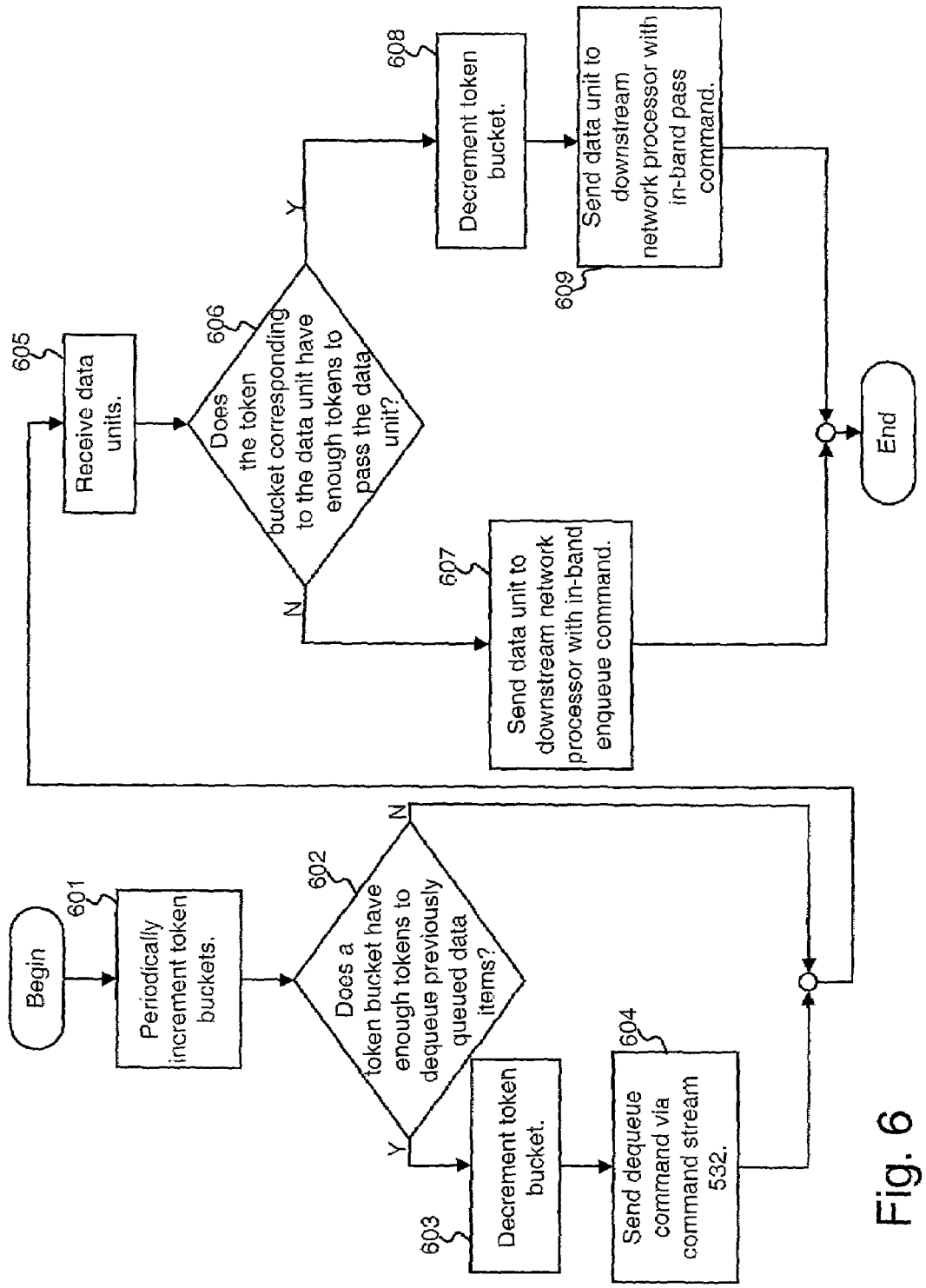
FIG. 6 is a flow chart illustrating operation of network processors 501 and 502 in implementing token bucket based traffic shaping.

FIG. 6 is a flowchart illustrating, in additional detail, operation of network processors 501 and 502 in implementing token bucket based traffic shaping.

Network processor 501 periodically increments its token buckets (Act 601). When a token bucket contains enough tokens to dequeue data units previously stored in one of buffers 520, network processor 501 decrements its corresponding token bucket and sends a dequeue command to network processor 502 (Acts 602, 603, 604). Otherwise, when network processor 501 receives data units, its checks whether its corresponding token bucket contains enough tokens to pass the data unit (Acts 605, 606). If so, network processor 501 decrements its token bucket and forwards the data unit to network processor 502 with an embedded pass command (Act 608, 609). In response, network processor 502 passes the data unit to its output port. If, however, network processor 501 does not have enough token buckets, it sends the data unit to network processor 502 with an embedded enqueue command (Acts 606, 607). Network processor 502 then queues the received data unit in an appropriate queue.

Figure 7:
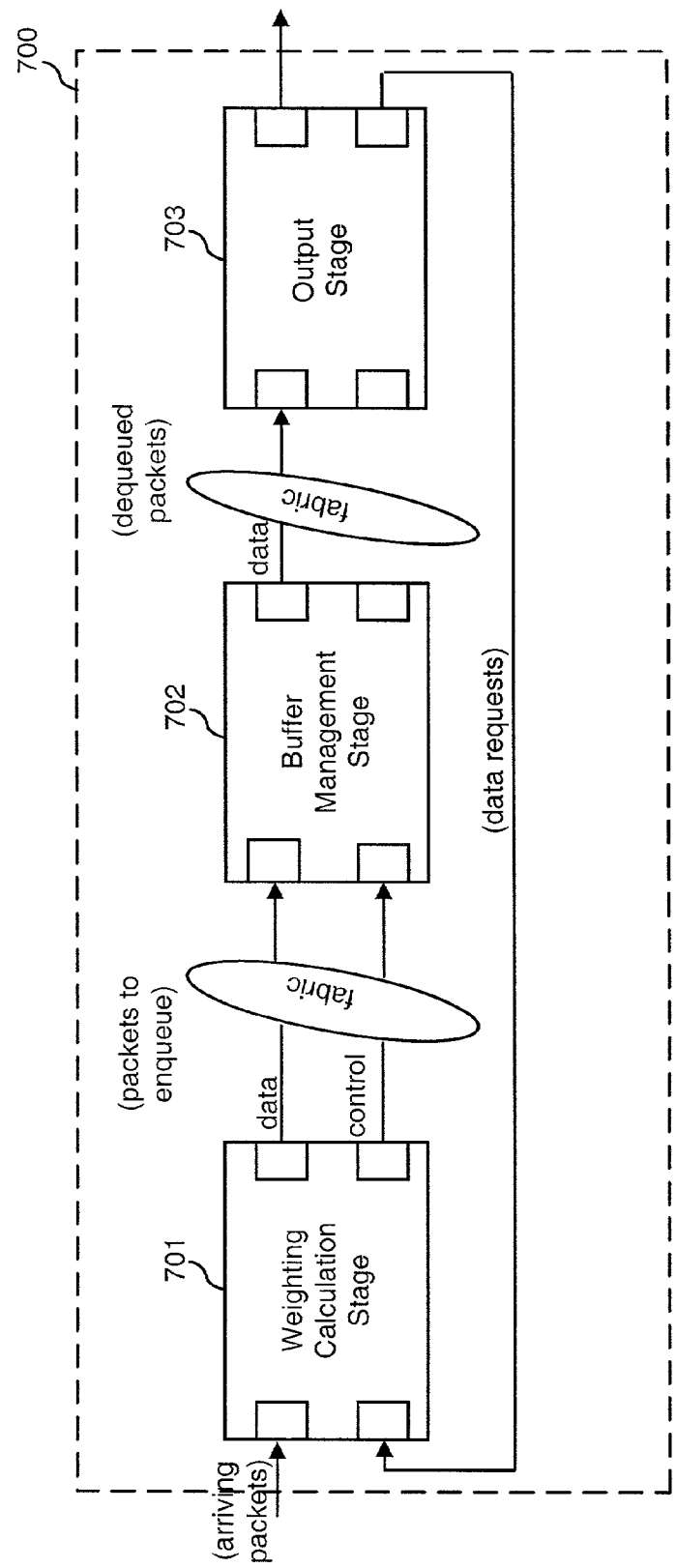
FIG. 7 is a diagram illustrating an application of a combined forward two-port and reverse two-port configurations.

FIG. 7 is a diagram illustrating an application of a network device 700 using both the forward two-port configuration and the reverse two-port configuration. Network device 700 implements a weighted traffic scheduling scheme made up of three network processor stages: weighting calculation stage 701, buffer management stage 702, and output stage 703. Weighting calculation stage 701 assigns priority levels to incoming packets. Different traffic classes are allotted different portions of the total bandwidth. In this manner, different priorities are assigned different shares (weights) of the total bandwidth.

Weighting calculation stage 701 examines its incoming packet classes and transmits the packets to buffer manager 702 based on the packet class. Weighting calculation stage 701 and buffer manager 702 are coupled together in a forward two-port configuration. Through this configuration, weighting calculation stage transmits control information relating to packet enqueuing and dequeuing to buffer manager 702. Dequeued packets are sent from buffer manager 702 to output stage 703. Output stage 703 is coupled back to weighting calculation stage 701 in a reverse two-port network. Accordingly, output stage 703 requests additional data by transmitting control information directly to weighting calculation stage 701.

SUMMARY

As described above, multiple network processors connect with one another through data ports and control ports. The network processors are arranged in a pipeline configuration and, among other functions, can efficiently implement a variety of flow control techniques. In one particular configuration, the network processors' data and control ports transmit in opposite directions to form a reverse two-port network. In another configuration, the network processors' data and control ports transmit in the same direction to form a forward two-port network. Hybrid combinations of reverse two-port and forward two-port configurations were also described.

It will be apparent to one of ordinary skill in the art that the embodiments as described above may be implemented in many different forms of software, firmware, and hardware in the entities illustrated in the figures. The actual software code or specialized control hardware used to implement aspects consistent with the present invention is not limiting of the present invention. Thus, the operation and behavior of the embodiments were described without specific reference to the specific software code or specialized hardware components, it being understood that a person of ordinary skill in the art would be able to design software and control hardware to implement the embodiments based on the description herein.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed is:

1. A network device comprising:
    a first network processor including
        at least one data port, and
        at least one control port; and
    a second network processor including
        a data port coupled to the data port of the first network processor, and
        a control port coupled to the control port of the first network processor, wherein
    the data and control ports of the first and second network processors connect the first and second network processors together in a pipeline configuration and wherein the first and second network processors implement data transmission protocols in the pipeline configuration, and wherein the first and second network processors are configurable to implement multiple data transmission protocols.

2. The network device of claim 1, further comprising:
    a fabric connected to the data and the control ports of the first and second network processors and configured to electrically couple the first and second processors, the data transmission protocols implemented by the first and second network processors being additionally configurable based on a configuration of the fabric.

3. The network device of claim 2, wherein the fabric is a crossbar arrangement of switches or a multi-stage network including crossbar switching elements.

4. The network device of claim 1, wherein network data is transmitted between the data ports of the first and second network processors in a first direction and data flow control information is transmitted between the control ports of the first and second network processors in a second direction.

5. The network device of claim 4, wherein the first and second directions are opposite of one another.

6. The network device of claim 5, wherein the second network processor receives the network data from the first network processor and controls the flow of the network data from the first network processor to the second network processor by sending network data request messages to the first network processor via the control ports.

7. The network device of claim 4, wherein the first and second directions are the same direction.

8. The network device of claim 7, wherein the first and second network processors implement token bucket flow control.

9. The network device of claim 8, wherein the first network processor further includes
    a plurality of token buckets configured to store an indication of an amount of new data eligible to be transmitted to the second network processor, the first network processor forwarding network data to the second network processor via the data ports and the first network processor forwarding control information to the second network processor via the control ports.

10. The network device of claim 9, wherein the second network processor further includes
    a plurality of buffers configured to store network data received from the first network processor, the second network processor dequeueing selected ones of the buffers in response to dequeue commands received from the first network processor via the control port.

11. A network processor comprising:
    a network data port configured to communicate network data to a network data port of a neighboring network processor; and
    a control port configured to communicate control information to a network control port of the neighboring network processor, the network processor and the neighboring network processor being coupled together through the data and control ports as a pipeline in which stages of the pipeline implement portions of a network data flow control protocol, wherein the network processor is configurable to implement a portion of a selected one of multiple network data flow control protocols.

12. The network processor of claim 11, wherein the data port and the control port connect to the neighboring network processor through a fabric.

13. The network processor of claim 12, wherein the fabric is a straight wire line connection between the network processor and the neighboring network processor.

14. The network processor of claim 12, wherein the fabric is a crossbar arrangement of switches or a multi-stage network including crossbar switching elements.

15. The network processor of claim 12, wherein the network processor transmits the network data to the neighboring processor via the data port in response to control messages received from the neighboring processor via the control port that indicates that the neighboring processor is requesting data.

16. The network processor of claim 12, wherein the network processor controls flow of data from the neighboring network processor through token buckets stored in the network processor.

17. The network processor of claim 12, wherein connections in the fabric are configurable to implement the different network flow control protocols.

18. A network device comprising:
    first processing means for implementing a first portion of a network data flow control protocol;
    second processing means for implementing a second portion of the network data flow control protocol, the second processing means communicating with the first processing means through a data port and a control port; and switch fabric means to couple the first processing means and the second processing means, wherein the first and second processing means are connected as a pipeline and wherein the first processing means, the second processing means, and the switch fabric means are configurable to implement different data flow control protocols.

19. The network device of claim 18, wherein network data is transmitted between the first and second processing means through the data ports in a first direction and wherein control information is transmitted between the first and second processing means through the control ports in a second direction.

20. The network device of claim 19, wherein the first and second directions are in the same direction.

21. The network device of claim 20, wherein the network data flow control protocol includes token bucket flow control techniques.

22. The network device of claim 19, wherein the first and second directions are in opposite directions.

23. The network device of claim 22, wherein the network data flow protocol includes egress feedback data flow control.

24. A network device for transmitting data comprising:
a first network processor having one input data port, one output data port, one input control port, and one output control port;
a second network processor having one input data port, one output data port, one input control port, and one output control port;
means for operatively coupling both said output data port of said first network processor to said input data port of said second network processor and said output control port of said first network processor to said input control port of said second network processor, whereby said first network processor and said second network processor are operatively coupled in a pipeline configuration; and,
said first network processor and said second network processor including means for implementing a plurality of data transmission protocols in said pipeline configuration, a particular one of the data transmission protocols that is implemented being configurable in the first network processor and the second network processor.

25. The network device of claim 24 and wherein said operatively coupling means further comprises a fabric.

26. The network device of claim 25 and wherein said fabric is wireline connection between said first network processor and said second network processor.

27. The network device of claim 25 and wherein said fabric is selected from the group of fabrics consisting of:
a crossbar arrangement of switches and a multistage network including crossbar switching elements.

28. The network device of claim 24 and wherein said data is transmitted from said output data port of said first network processor to said input data port of said second network processor, and said input control port of said first network processor receives data flow control information from said output control port of said second processor.

29. The network device of claim 24 and wherein said data is transmitted from said output data port of said first network processor to said input data port of said second network processor, and said input control port of said second network processor receives data flow control information from said output control port of said first network processor.

30. The network device of claim 29 and wherein said data transmission protocols implementing means includes a token bucket flow controller.

31. The network device of claim 30 and wherein said token bucket flow controller further comprises:
a plurality of token buckets configured in said first network processor to store an indication of an amount of new data eligible to be transmitted from said output data port of said second network processor; and,
a plurality of buffers configured in said second network processor to store said data from said first network processor, said second network processor including means, responsive to dequeue commands related to said indication and received via said output control port of said first network processor, for selecting and dequeuing certain of said buffers.

* * * * *